United States Patent [19]

Kang

[11] Patent Number: 5,375,197
[45] Date of Patent: Dec. 20, 1994

[54] SYSTEM AND METHOD FOR AUTOMATICALLY DISTINGUISHING BETWEEN GRAPHIC INFORMATION AND TEXT INFORMATION OF IMAGE DATA

[75] Inventor: Min S. Kang, Seoul, Rep. of Korea
[73] Assignee: Goldstar Co. Ltd., Rep. of Korea
[21] Appl. No.: 816,040
[22] Filed: Dec. 30, 1991
[30] Foreign Application Priority Data
Dec. 31, 1990 [KR] Rep. of Korea .............. 23060/1990
[51] Int. Cl.$^5$ ............................................. G06F 15/62
[52] U.S. Cl. .................................................. 395/147
[58] Field of Search ...................... 395/147; 382/9, 11, 382/57, 61, 55

[56] References Cited

U.S. PATENT DOCUMENTS

| | | | |
|---|---|---|---|
| 4,149,091 | 4/1979 | Crean et al. | 250/566 |
| 4,577,235 | 3/1986 | Kannapell et al. | 358/280 |
| 4,589,144 | 5/1986 | Namba | 382/61 |
| 4,953,230 | 8/1990 | Kurose | 382/46 |

FOREIGN PATENT DOCUMENTS

| | | | |
|---|---|---|---|
| 0397428 | 11/1990 | European Pat. Off. | H04N 1/387 |
| 0404236 | 12/1990 | European Pat. Off. | H04N 1/40 |

OTHER PUBLICATIONS

1988 International Display Research Conference, 4 Oct. 1988, San Diego, Calif., pp. 146–151; Tomikawa: "An Identification of Pseudo Continuous Tone by Labeling".

Primary Examiner—Robert W. Beausoliel, Jr.
Assistant Examiner—Stephen C. Elmore
Attorney, Agent, or Firm—Ostrolenk, Faber, Gerb & Soffen

[57] ABSTRACT

A system for automatically distinguishing between graphic information and text information of image data, comprising a buffering circuit for storing image data from an A/D converter by an address from an address generator or outputting the stored image data to a data bus by an address from a microprocessor under a control of the microprocessor. Also, according to the present invention, there is provided a method for automatically distinguishing between graphic information and text information of image data, comprising the steps of converting an analog image signal from a scanner into digital image data and storing the digital image data by the line unit, reading the stored image data by the four line unit, subdividing the read image data into contiguous image data blocks and evaluating a block average, evaluating a background color illumination utilizing the evaluated block average, setting a distinguishing unit as windows each of which includes a predetermined number of contiguous blocks and distinguishing between a text portion and a graphic portion of the image data by the window unit, correcting an incorrectly distinguished window, performing an alignment of the edges of graphic/text portions, and correcting the delay of the real time and completing the distinction between graphic/text portions.

6 Claims, 3 Drawing Sheets

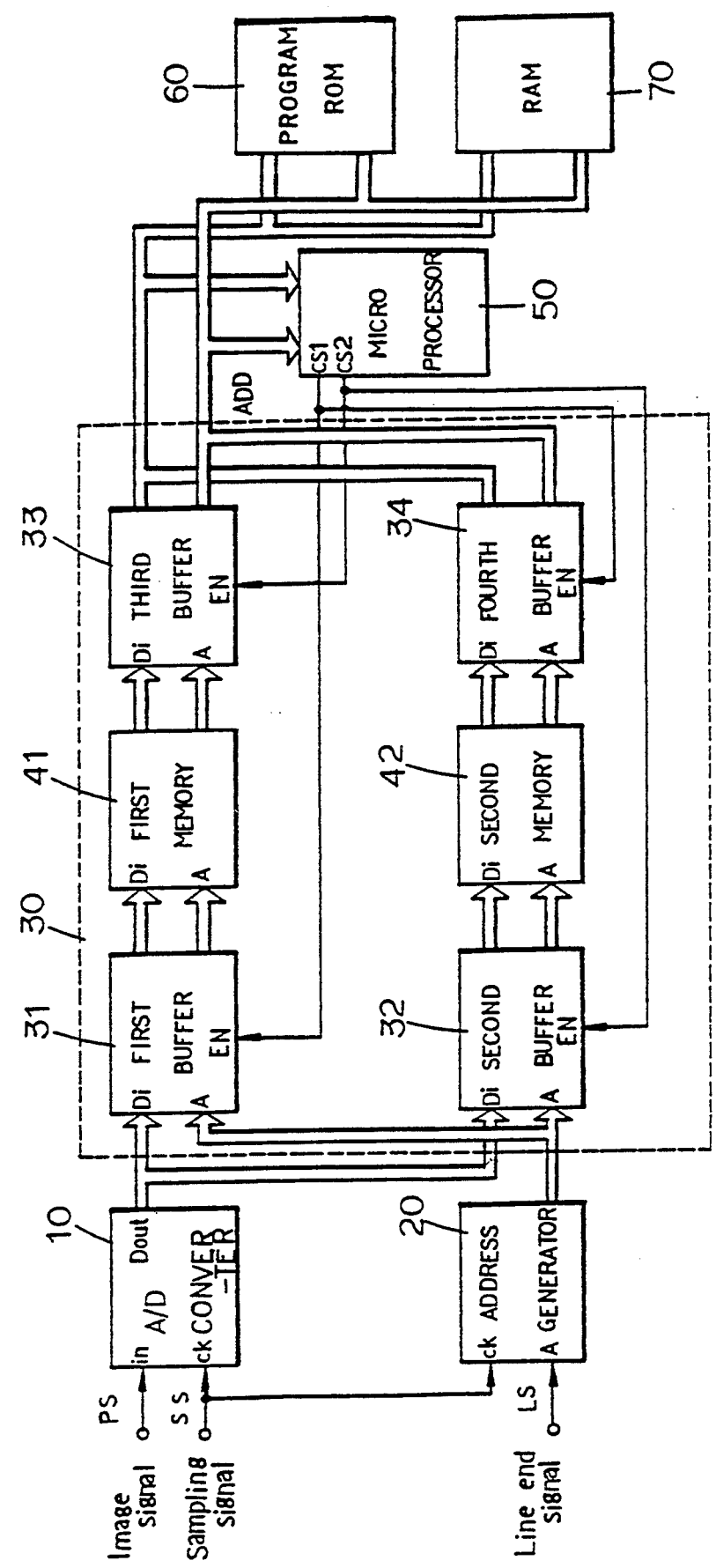

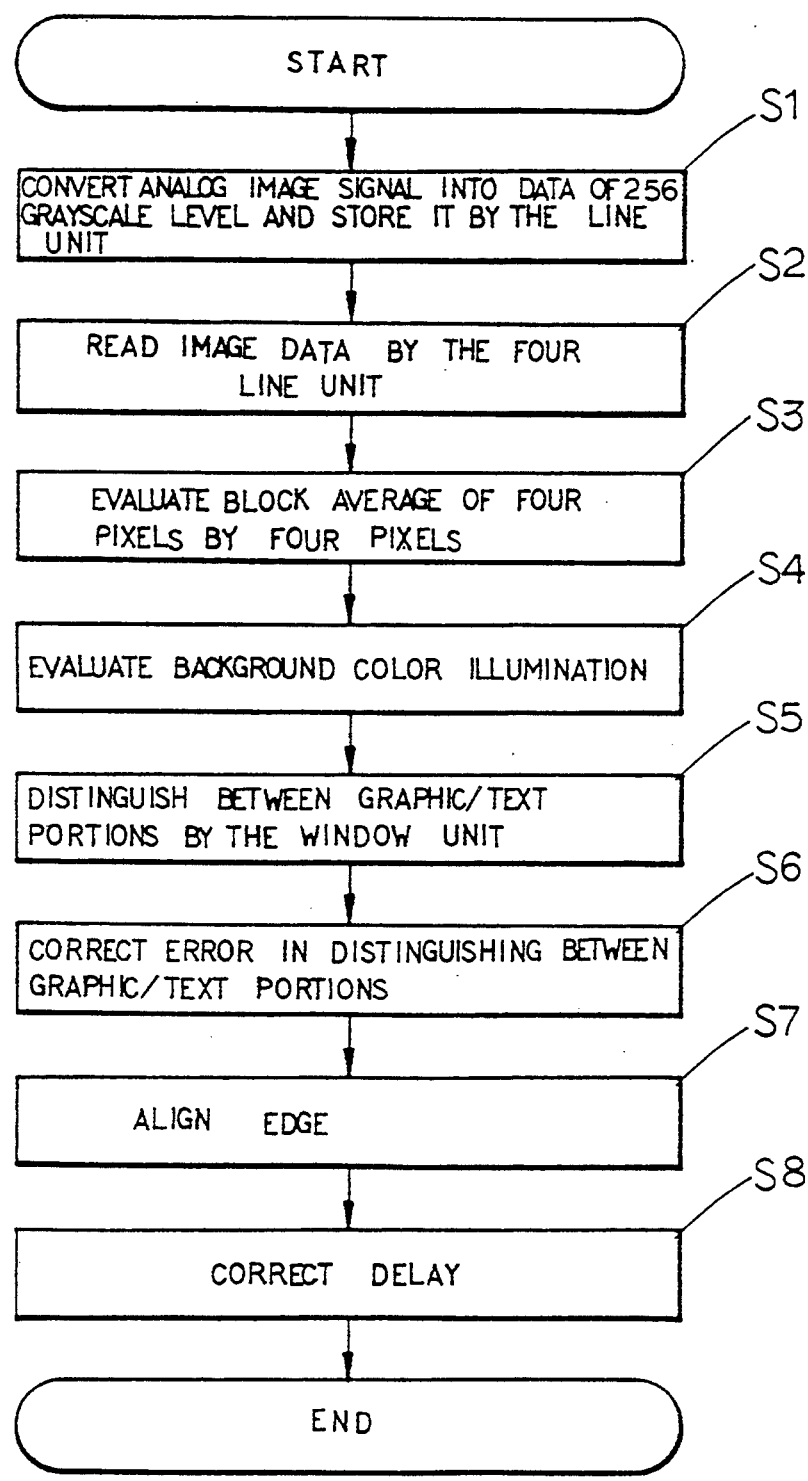

FIG. 3.

| | |
|---|---|
| CENTER CORRECTION | G　　　G　　　　L　　　　L<br>G L G ⇒ G　G G • L　G L ⇒ L　L L<br>G　　　G　　　　L　　　　L |
| HORIZONTAL CORRECTION | L G L ⇒ L L L, G L G ⇒ G G G, LGGL ⇒ LLLL |
| VERTICAL CORRECTION OF GRAPHIC PORTION | L　　L　　L　　L　　L　　　　L<br>G　　G　　L　　G　　L　　　　L<br>G or G or G or L or L　⇒　L<br>G　　L　　G　　L　　G　　　　L<br>L　　L　　L　　L　　L　　　　L |
| VERTICAL CORRECTION OF TEXT PORTION | G　　G　　G　　G　　G　　　　G<br>L　　L　　G　　L　　G　　　　G<br>L or L or L or G or G　⇒　G<br>L　　G　　L　　G　　L　　　　G<br>G　　G　　G　　G　　G　　　　G |

FIG. 4.

(A) 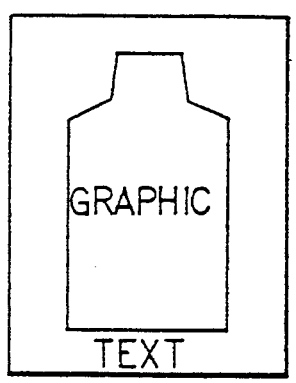

ACTUAL DOCUMENT (B) 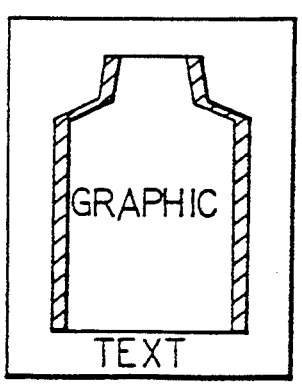

AFTER DISTINGUISHING (C) 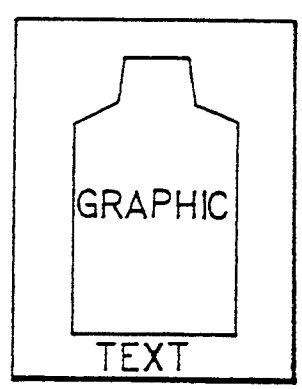

AFTER THINNING

SYSTEM AND METHOD FOR AUTOMATICALLY DISTINGUISHING BETWEEN GRAPHIC INFORMATION AND TEXT INFORMATION OF IMAGE DATA

BACKGROUND OF THE INVENTION

1. Field of the invention

The present invention relates in general to a system and method for automatically distinguishing between graphic information and text information of image data, and more particularly to a system for automatically distinguishing between graphic information and text information of image data, by use of grayscale levels and in a simple manner which binarizes the image data, so that the graphic and text of the image are clearly represented.

2. Description of the Prior Art

Known prior art techniques for distinguishing between graphic information and text information of image data are disclosed in U.S. Pat. Nos. 4,577,235 and 4,554,593.

First, grayscale image data obtained by scanning a document to be duplicated is partitioned into contiguous image data blocks (for example, four pixels by four pixels) which are processed to determine whether the portions of the image represented by the data blocks corresponds to text or graphic portions of the document. An average grayscale value is determined for each data block and used as an indexing variable for at least one additional characteristic determined for the block. Additional characteristics include a block variance, a block edge count, a block agreement count and a block text average. A one dimensional Gaussian Distribution is generated to distribute the data values of any additional characteristics for each possible grayscale value of a block. The mean and standard deviation are determined for each data distribution and Mahalanobis distance for each characteristic data value is determined. The Mahalanobis distance is a representative probability for whether the image data block corresponds to a text portion of the image or a graphic portion of the image.

Gaussian distributions are generated for both text data and graphic data such that probabilities for both text and graphic can be estimated independently for each image data block. The text probability is then normalized by dividing it by the sum of the two probabilities. The normalized text probability is then utilized to determine whether the data blocks correspond to text or graphic portions of the image.

However, the above-mentioned conventional technique for distinguishing graphic/text portions from each other has a disadvantage of the overloaded software and thus the delayed data determination speed, since the characteristic of block classified into four types is adopted to the distinction of graphic/text portions. In constituting a system which processes input signal within the real time to achieve the distinction of graphic/text portions, there is a problem of the delay of real time corresponding to 9 blocks (36 lines), in that the environment is subjected to a cross type scanning which involves a vertical scanning to a maximum of nine blocks and a lateral scanning to a maximum of nine blocks.

SUMMARY OF THE INVENTION

Therefore, an object of the invention is to eliminate the above-mentioned disadvantages encountered in the prior art and to provide a system and a method for automatically distinguishing between graphic information and text information of image data, wherein the distinction between graphic/text portions by the window unit is achieved by utilizing the block average and the error in distinguishing between graphic/text portions is corrected by the accurate correction of the environment that is accomplished only by scanning windows to a maximum of five, thereby enabling the reduction in the load of software and the data processing at high speed.

Another object of the invention is to provide a system and a method for automatically distinguishing between graphic information and text information of image data, which can be applied to the binarization of image data so that the graphic portion and the text portion of image data is subjected to a halftone treatment and an adaptive binarization, respectively, thereby enabling the graphic/text portions of image data to be clearly reproduced.

In accordance with one aspect of the present invention, there is a system for automatically distinguishing between graphic information and text information of image data, comprising: an A/D converter for converting an analog image signal outputted from a scanner into digital image data; an address generator means for inputting a line end signal from the scanner to generate an address; one or more buffers for storing the image data from the A/D converter in accordance with the address applied from the address generator for outputting the stored image data to a data bus in accordance with an external address; and a microprocessor for inputting the image data from the buffers to distinguish between a graphic portion and a text portion of the image data and controlling the whole operation of the system.

In accordance with another aspect of the present invention, there is provided a method for automatically distinguishing between graphic information and text information of image data, comprising the steps of: (a) converting an analog image signal outputted from a scanner into digital image data and storing the digital image data by the line unit; (b) reading the image data stored at the step (a) by the four line unit; (c) subdividing the read image data into contiguous image data blocks with a desired mask and evaluating a block average; (d) evaluating a background color illumination utilizing the block average evaluated at the step (c); (e) setting a distinguishing unit as windows each of which includes a predetermined number of contiguous blocks and distinguishing between a text portion and a graphic portion of the image data by the window unit; (f) correcting an incorrectly distinguished window after completing the step (e); (g) performing an alignment of the edges of graphic/text portions after the completion of the step (e); and (h) correcting the delay of the real time after the completion of the step (g) and then completing the distinction between graphic/text portions.

BRIEF DESCRIPTION OF THE DRAWINGS

The above and other objects, features and advantages of the present invention will be more clearly understood from the following detailed description taken in conjunction with the accompanying drawings, in which:

FIG. 1 is a functional block diagram of a system of automatically distinguishing between graphic information and text information of image data in accordance with the present invention;

FIG. 2 is a flowchart illustrating an operation of the system in FIG. 1 in accordance with the present invention;

FIG. 3 is a mask pattern for illustrating a correcting operation of the system in FIG. 1 in accordance with the present invention; and FIG. 4(A through C) is a view illustrating an edge thinning operation of the system in FIG. 1 in accordance with the present invention.

DESCRIPTION OF PREFERRED EMBODIMENTS

First, a construction of a system of automatically distinguishing between graphic information and text information of image data in accordance with the present invention will be described with reference to FIG. 1.

With reference to FIG. 1, there is shown a functional block diagram of a system of automatically distinguishing between graphic information and text information of image data in accordance with the present invention. As shown in this drawing, the system of the present invention comprises an A/D converter 10 for converting an analog image signal PS outputted from a scanner (not shown) into digital image data synchronously with a sampling signal SS, an address generator 20 for inputting a line end signal LS from the scanner to generate an address synchronously with the sampling signal SS, a buffering circuit 30 for storing the image data from the A/D converter 10 in accordance with the address applied from the address generator 20 or outputting the stored image data to a data bus in accordance with an external address, and a microprocessor 50 for inputting the image data from the buffering circuit 30 to distinguish between a graphic portion and a text portion of the image data and controlling the whole operation of the system.

The buffering circuit 30 includes first and second buffers 31 and 32 for buffering the addresses from the address generator 20 and the image data from the A/D converter 10 respectively in response to control signals CS1 and CS2 from the microprocessor 50, first and second memories 41 and 42 for storing respectively output data from the first and second buffers 31 and 32 in accordance with the buffered addresses from the first and second buffers 31 and 32, and third and fourth buffers 33 and 34 for buffering addresses applied from the microprocessor 50 to apply the buffered addresses as output addresses to the first and second memories 41 and 42 and outputting the image data from the first and second memories 41 and 42 to the microprocessor 50, respectively in response to the control signals CS2 and CS1 from the microprocessor 50.

Herein, the reference numerals, not described, designate a programmable ROM and a RAM, respectively. The circuit elements in FIG. 1 have, were shown, terminals designated by the characters "A", "Di", "EN", "ck", "Dout".

Now, the operation of the system of automatically distinguishing between the graphic information and text information of the image data, which is constructed as mentioned above, in accordance with the present invention will be described in detail with reference to FIGS. 2 through 4.

First, upon powering the system, the analog image signal PS obtained by scanning a document with the scanner is inputted to the A/D converter 10. The A/D converter 10 converts the inputted analog image signal into digital image data synchronously with the sampling signal SS. The address generator 20 inputs the line end signal LS from the scanner and generates address as input address to the first and second memories 41 and 42 in accordance with the inputted line end signal LS synchronously with the sampling signal SS.

The microprocessor 50 outputs the signals CS1 and CS2 to control the buffers 31 through 34. Under these controls of the microprocessor 50, the first and second memories 41 and 42 are coupled to the A/D converter 10 and the address generator 20 to store the image data from the A/D converter 10 in accordance with the address applied from the address generator 20, or are coupled to the microprocessor 50 to output the stored image data.

Namely, first, if the microprocessor 50 outputs the control signal CS1 as active signal while the control signal CS2 is made inactive, the first and fourth buffers 31 and 34 are enabled while the second and third buffers 32 and 33 are disabled. As a result, the image data from the A/D converter 10 is stored in the location of the first memory 41 addressed by the address generator 20 through the enable first buffer 31. Also, the image data stored in the location of the second memory 42 addressed by the microprocessor 50 is outputted to the microprocessor 50 through the enable fourth buffer 34.

Then, the microprocessor 50 outputs the control signal CS2 as active signal while the control signal CS1 is made inactive, the first and fourth buffers 31 and 34 are disabled while the second and third buffers 32 and 33 are enabled. As a result, the image data stored in the location of the first memory 41 addressed by the microprocessor 50 is outputted to the microprocessor 50 through the enable third buffer 33. Also, the image data from the A/D converter 10 is stored in the location of the second memory 42 addressed by the address generator 20 through the enable second buffer 32.

The image data obtained from the scanner is stored in the first and second memories 41 and 42 in accordance with the address from the address generator 20 and the image data stored in the first and second memories 41 and 42 is outputted to the data bus to the microprocessor 50 under the address control of the microprocessor 50. The grayscale level is determined based on the number of output bits from the A/D converter 10 for the image data stored in the first and second memories 41 and 42, For example, if the A/D converter 10 is an 8 bits A/D converter, the grayscale level is 256 at a maximum for the converted image data to be stored by the line unit in the first and second memories 41 and 42. The image data of the maximum 256 grayscale level is in turn stored by and outputted by the four line unit in/from the first and second memories 41 and 42 in accordance with the alternating timing of the control signals CS1 and CS2 from the microprocessor 50.

Accordingly, the analog image signal is converted into the digital data of the maximum 256 grayscale level and the digital data is stored by the line unit in the first and second memories 41 and 42 at the step S1 in FIG. 2. The stored image data is read by the four line unit by the microprocessor 50 at the step S2. Then, the microprocessor 50 subdivides the read image data into contiguous image data blocks each of which preferably comprises four pixels by four pixels and evaluates a block average at the step 83. The block average is essentially the average grayscale value of the pixels represented by an image data block and thus the maximum block average is 256 for four pixels by four pixels.

Then, a background color illumination is evaluated by utilizing the block average at the step S4. A block set is formed by three blocks. A block average is evaluated for the block set of three blocks. The background color illumination is determined by the greatest one of block averages of the block sets of the image. The block average is larger when the blocks mainly include a white color; smaller when the blocks mainly include a black color. Namely, the block average is proportioned to the brightness of block. The forming of three blocks into a block set functions as a low-pass filter to reduce a load of software and a probability for occurrence of error than in evaluating the background color illumination by a unit block.

After the background color illumination is evaluated, it is performed the step S5 of discriminating a text portion and a graphic portion of the image and distinguishing between the text portion and the graphic portion of the image in accordance with the discriminated result. The text portion of the image essentially includes at least one block of the same illumination as the background color illumination, since there are present space portions between adjacent text portions and adjacent text lines. Thus, the text portion of the image is determined by a window with a block of the same illumination as the background color illumination.

At the step S5 of distinguishing between the text portion and the graphic portion of the image, the distinguishing unit is set as windows each of which preferably includes contiguous sixteen blocks. The reference value is determined for the text and graphic portions of the image by multiplying the background color illumination obtained at the step S4 by an error correcting value, preferably, 0.8–1. If the window includes at least one block greater than the reference value, i.e., if the window includes at least one block with the background color illumination, the window is determined as window of the text portion of the image. Otherwise, if the window includes no block greater than the reference value, the window is determined as window of the graphic portion of the image. The purpose of multiplying the background color illumination by the error correcting value 0.8–1 to determine the reference value for distinguishing between the text portion and the graphic portion of the image is to correct an error of an input sensor of the scanner scanning the document. The better the performance of the input sensor, the nearer the error correcting value one.

After it is completed the step S5 of discriminating a text portion and a graphic portion of the image and distinguishing between the text portion and the graphic portion of the image in accordance with the discriminated result, it is performed the step S6 of discriminating and correcting an incorrectly distinguished window, i.e., a window of the text portion which is incorrectly discriminated and distinguished as window of the graphic portion and vice-versa.

At the step S6 of correcting an incorrectly distinguished window, the correcting operation is performed by scanning environments by five windows with a mask pattern, as shown in FIG. 3. Herein, "L" represents a window of the text portion and "G" represents a window of the graphic portion.

The window correction preferably includes a center correction, a horizontal correction and a vertical correction as shown in FIG. 3. In the center correction of FIG. 3, when the window "L" of the text portion is surrounded with the windows "G" of the graphic portion, the window "L" of the text portion is discriminated as an incorrect window and thus corrected as the window "G" of the graphic portion, since, in the document, there is actually present no text portion such small as to include only one window. On the contrary, when the window "G" of the graphic portion is surrounded with the windows "L" of the text portion, the correcting operation is performed in the same manner as that of the text portion.

Also, the horizontal correction, the vertical graphic portion correction and the vertical text portion correction as shown in FIG. 3 are performed in the same manner as that of the center correction. Namely, when both edge windows of contiguous windows (3–5 in number) are those of the same portion and at least one of the inner windows is one of a portion different from the portion of the both edge windows, the window of the different portion is corrected as window of the same portion as that of the edge windows. In the correction by windows, a vertical width by windows is one block and thus the vertical scanning of five windows means the vertical scanning of five blocks. Therefore, a delay of the system operation is reduced as compared with that of nine block scanning of the prior art.

After the correction of the information portions distinguished by the window unit in the step S6, the step S7 of thinning edges of graphic/text portions by the block unit is performed. In actual, the distinguished graphic and text portions in the document can not be clearly distinguished therebetween. Accordingly, it is necessary to thin edges of graphic/text portions by the block unit, so as to define correctly them.

In the step S7, an alignment of the edges of graphic/text portions are achieved. That is, when a variation in a window occurs, namely, when the window is changed from the graphic portion to the text portion or from the text portion to the graphic portion, the edge of the varied window is detected and then thinned. The edge is discriminated by the portion of window where the illuminance of window is abruptly increased or abruptly decreased.

When the actual document shown in FIG. 4A is distinguished into graphic and text portions by the window unit, the edges of graphic/text portions in the document are different from those in each window. In case of the graphic/text portions distinguished by the window unit, they are overlapped as shown in FIG. 4B. For dividing correctly the overlapped graphic/text portions along the edge defined in the actual document, the edge of each window having the overlap portion is divided into blocks and a discrimination is made as to whether each block has the illumination higher than the threshold. In case of the left edge, the blocks ranging from the first block to the block having the illumination lower than the threshold are distinguished as the text portion. The blocks ranging from the block next to the latter block to the last block are distinguished as the graphic portion. In case of the right edge, the blocks ranging from the first block to the block having the illumination higher than the threshold are distinguished as the graphic portion. The blocks ranging from the block next to the latter block to the last block are distinguished as the text portion. As the edge of the graphic/text portions distinguished by the window unit is thinned by the block unit as above-mentioned, the graphic/text portions can be distinguished in closely similar to the distinction between the graphic/text portions in the actual document, as shown in FIG. 4C.

Thereafter, the step S8 is performed which corrects the delay of the real time. Thus, the distinction between the graphic/text portions is completed.

As apparent from the above description, the present invention provides a method and a system for automatically distinguishing between graphic information and text information of image data, which are capable of performing the steps of detecting block average, distinguishing the graphic/text portions from each window by utilizing the block average, correcting the error in the distinction of the graphic/text portions, thinning the edge of each window and correcting the delay of the real time. Accordingly, the processing speed of microprocessor is increased, thereby enabling the data processing at high speed. Upon correcting the error in distinguishing between the graphic/text portions, the environment can be accurately corrected only by scanning windows to a maximum of five, thereby enabling the delay of the real time to be shortened. Furthermore, the overall processing can be completed within the time near the real time. Also, the data input hardware can be simple, thereby enabling the overall system construction to be simple. In particular, the present invention provides an advantage, when it is applied to the binarization of image data. In this case, the graphic portion of image data is subjected to a halftone treatment, while the text portion is subjected to an adaptive binarization. As a result, the graphic/text portions of image data can be cleanly reproduced, while the binarization is achieved without any distinction of the graphic/text portions.

Although the preferred embodiments of the present invention have been disclosed for illustrative purpose, those skilled in the art will appreciate that various modifications, additions and substitutions are possible, without departing from the scope and spirit of the invention as disclosed in the accompanying claims.

What is claimed is:

1. A method for automatically distinguishing between information and text information of image data, comprising the steps of:
   (a) converting an analog image signal outputted from a scanner into digital image data and storing the digital image data for each line unit;
   (b) reading the digital image data stored at said step (a) on the basis of four line units;
   (c) subdividing the read image data into contiguous image data blocks with a desired mask and evaluating a block average;
   (d) evaluating a background color illumination utilizing the block average evaluated at said step (c);
   (e) setting a distinguishing unit as windows each of which includes a predetermined number of contiguous blocks and distinguishing between a text portion and a graphic portion of the image data by use of a window unit;
   (f) correcting an incorrectly distinguished window after completing said step (e);
   (g) performing an alignment of edges of graphic/text portions after the completion of the step (e); and
   (h) correcting for a real time delay after the completion of the step (g) and then completing distinguishing between graphic/text portions;
   wherein said step (e) of distinguishing between the text portion and the graphic portion of the image data includes the step of:
   if the window includes at least one block with the background color illumination, determining the window as a window of the text portion of the image data; if the window includes no block with the background color illumination, determining the window as a window of the graphic portion of the image data.

2. A method for automatically distinguishing between graphic information and text information of image data, as set forth in claim 1, wherein said block with the background color illumination is present in a block set of block average greater than a value obtained by multiplying the background color illumination by an error correcting value.

3. A method for automatically distinguishing between graphic information and text information of image data, as set forth in claim 2, wherein said error correcting value is a value below, but closely near one, which is obtained by experiment.

4. A method for automatically distinguishing between graphic information and text information of image data, comprising the steps of:
   (a) converting an analog image signal outputted from a scanner into digital image data and storing the digital image data for each line unit;
   (b) reading the digital image data stored at said step (a) on the basis of four line units;
   (c) subdividing the read image data into contiguous image data blocks with a desired mask and evaluating a block average;
   (d) evaluating a background color illumination utilizing the block average evaluated at said step (c):
   (e) setting a distinguishing unit as windows each of which includes a predetermined number of contiguous blocks and distinguishing between a text portion and a graphic portion of the image data by use of a window unit;
   (f) correcting an incorrectly distinguished window after completing said step (e);
   (g) performing an alignment of edges of graphic/text portions after the completion of the step (e); and
   (h) correcting for a real time delay after the completion of the step (g) and then completing distinguishing. between graphic/text portions;
   wherein said step (f) of correcting the incorrectly distinguished window includes the step of:
   in vertical and horizontal correction cases where both edge windows of vertical and horizontal contiguous five windows are those of a same portion and at least one of inner windows is one of a portion different from a portion of edge windows, correcting the window of the different portion as a window of the same portion as that of the edge windows.

5. A method for automatically distinguishing between graphic information and text information of image data, comprising the steps of:
   (a) converting an analog image signal outputted from a scanner into digital image data and storing the digital image data for each line unit;.
   (b) reading the digital image data stored at said step (a) on the basis of four line units;
   (c) subdividing the read image data into contiguous image data blocks with a desired mask and evaluating a block average;

(d) evaluating a background color illumination utilizing the block average evaluated at said step (c);
(e) setting a distinguishing unit as windows each of which includes a predetermined number of contiguous blocks and distinguishing between a text portion and a graphic portion of the image data by use of a window unit;
(f) correcting an incorrectly distinguished window after completing said step (e);
(g) performing an alignment of edges of graphic/text portions after the completion of the step (e); and
(h) correcting for a real time delay after the completion of the step (g) and then completing distinguishing between graphic/text portions;
wherein said step (g) of performing the alignment edges of graphic/text portions includes the step of:

thinning a window representative of a varied information portion which is changed from the graphic portion to the text portion or from the text portion to the graphic portion, to align an edge of the window.

6. A method for automatically distinguishing between graphic information and text information of image data, as set forth in claim 5, wherein said thinning step includes the step of:

discriminating whether each block of the window representative of the varied information portion has the illumination higher than a threshold, discrimination is started with left end blocks and distinguishing the blocks having the illumination higher than the threshold as the text portion.

* * * * *